UNITED STATES PATENT OFFICE.

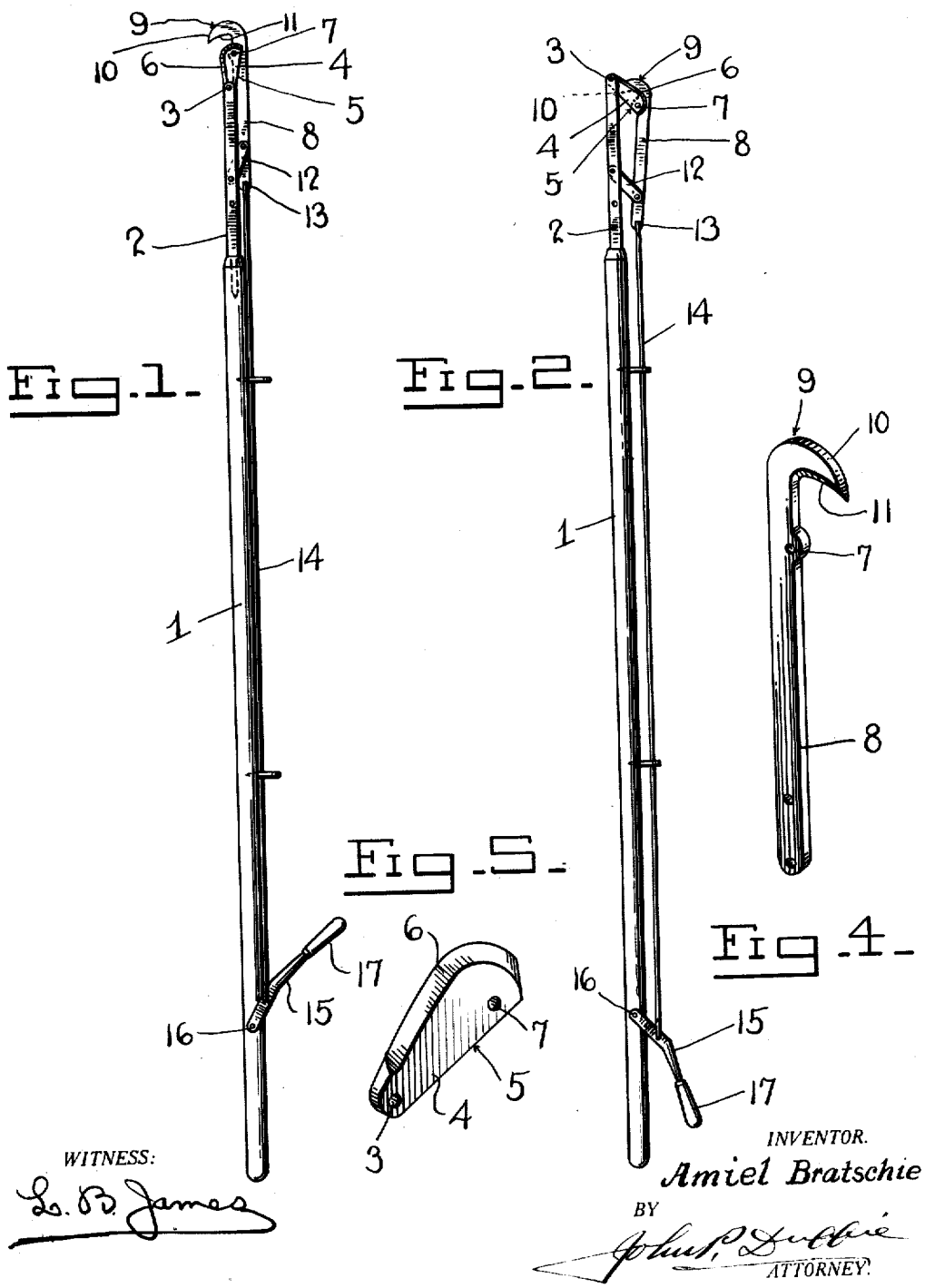

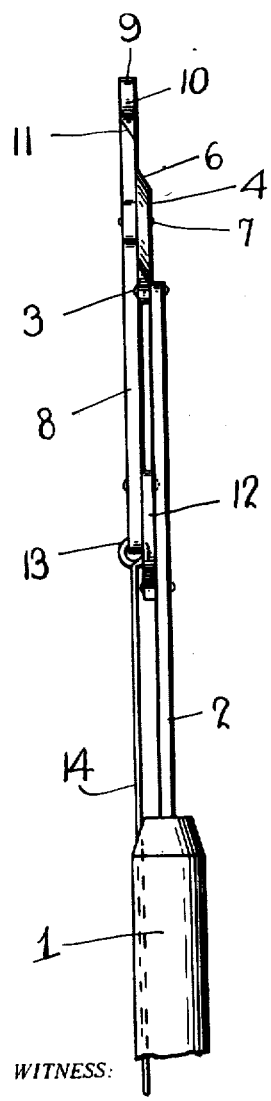
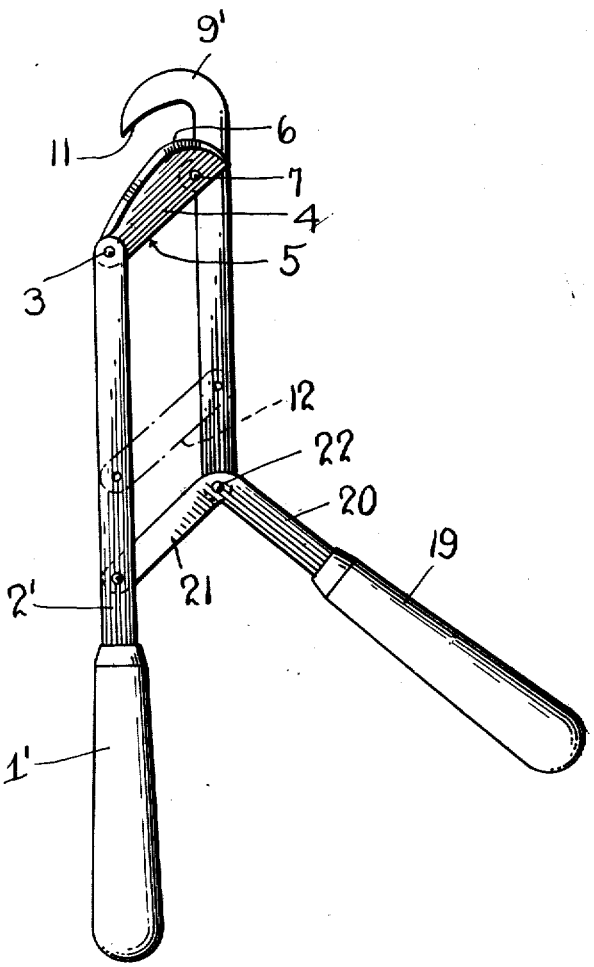

AMIEL BRATSCHIE, OF NEW CASTLE, PENNSYLVANIA.

PRUNING SHEARS.

1,425,744.  Specification of Letters Patent.  Patented Aug. 15, 1922.

Application filed February 26, 1919. Serial No. 279,261.

*To all whom it may concern:*

Be it known that I, AMIEL BRATSCHIE, a citizen of the United States, residing at New Castle, in the county of Lawrence and State of Pennsylvania, have invented certain new and useful Improvements in Pruning Shears, of which the following is a specification.

My invention relates to new and useful improvements in pruning shears, and is especially adapted for distant work.

The principle object of my invention is to provide a pruning shears in which the cutting blades and associated parts are in closed or folded position preparatory to the cutting or trimming operation, whereby the device may be much more readily and conveniently used by the operator for the reason that there are no spreading blades or other protruding parts to become caught in the limbs or other parts of the tree.

A further object of my invention is to provide a pruning shears having an improved cutting action, whereby the trimming operation is not only expedited but the effort required on the part of the operator in cutting off a limb or other part of the tree reduced to the minimum.

With the foregoing and other objects in view that will appear as the nature of the invention is better understood, the same consists in the novel features of construction, combination and arrangement of parts illustrated in the drawings and more particularly pointed out in the appended claims.

In the accompanying drawings:—

Fig. 1 is a view in side elevation of pruning shears constructed in accordance with an embodiment of my invention, showing the folded position of the cutting blades and associated parts preparatory to the cutting operation.

Fig. 2 is a similar view, showing the position of the parts at the completion of the cutting operation.

Fig. 3 is an edge view of Fig. 1.

Fig. 4 is a detail perspective view of the relatively stationary cutting member, and Fig. 5 is a similar view of the oscillating cutting blade.

Figure 6 is a view in side elevation illustrating pruning shears constructed in accordance with another embodiment of my invention.

Referring to the drawings for a more particular description of the invention and in which drawings like parts are designated by like characters throughout the several views, the device comprises a relatively long cylindrical pole or handle 1, preferably of wood, provided at its outer end with the flat metal shank 2. Pivoted at one end to the outer or free end of the shank 2, is an oscillating cutting blade 4, preferably formed with a straight inner edge 5 and an outwardly curved beveled outer cutting edge 6. The opposite or outer end of the oscillating blade 4 is pivoted, as at 7, to the corresponding end of the shank 8 of the relatively stationary cutting member 9, the outer end of which terminates somewhat beyond but adjacent to the outer end of the blade 4, in an inwardly extending laterally disposed hook 10, preferably formed with an inner beveled edge 11, which cooperates with the oscillating cutting blade 4 in the cutting or trimming process.

The inner end of the shank 8 of member 9 is operatively connected with the shank 2 of the pole or handle 1 by the flat link 12, which is disposed at an upward inclination, when the parts are in folded position, as illustrated in Fig. 1 of the drawings. The extreme inner end of shank 8 of member 9 is connected, as at 13, by the longitudinal rod or link 14 with the operating lever 15, pivoted at its inner end, as at 16, with the inner end of the pole or handle 1. The outer end of operating lever 15 is provided with a suitable handle 17, as shown.

In practice, the hook 10 of the relatively stationary cutting member 9 is hooked over the limb or other part of the tree to be severed, with the parts in closely folded position, as shown in Fig. 1. Grasping the inner end of the pole or handle 1 securely with one hand, the operator pulls down the operating lever 15 with the other hand from the position shown in Fig. 1 to that shown in Fig. 2 of the drawings. This operation closes the cutting blades, as shown in Fig. 2 and also causes the shanks 2 and 8 to assume the laterally spaced position indicated in said figure.

To prevent any undue strain or stress on the pole or handle 1, the same may be provided at suitable intervals along its length, with the guides 18 for the connecting rod 14.

It will be observed that the oscillating action or movement of the blade 4, in conjunction with the cutting edge 11 of member 9, affords a shearing action in severing or cutting off the limb, branch or other part of the tree, whereby this operation is facilitated and may be performed with greater ease by the operator. Although preferably, the inner edge 11 of the hook 10 is not necessarily beveled, but may be a flat edge if desired.

In Fig. 6 of the drawings, I have shown a form of pruning shears especially adapted for close work. In this form, the handle 1' is made considerably shorter than the pole or handle 1, while the handle 19 is normally disposed on an outward inclination with handle 1' and its shank 20 provided with a right-angularly disposed outer end portion 21 pivoted to the shank 2'. The inner end of the cutting member 9' is pivotally connected, as at 22, to the shank of the handle 19 and the shank 2' of handle 1' and the cutting member 9' are disposed in laterally spaced relation preparatory to the cutting or trimming operation, as distinguished from the form of pruning shears used for distant work, in which the cutting blades and associated parts are in closely folded position at this state of the cutting operation.

From the foregoing description taken in connection with the drawings, it is thought that the construction, operation and advantages of my invention will be readily understood without requiring a more extended explanation.

Various changes in the form, proportions and minor details of construction may be resorted to without departing from the principles or sacrificing any of the advantages of this invention as defined in the appended claims.

Having described my invention, what I claim as new and desire to secure by Letters Patent, is:

1. A pruning shears comprising a pole or handle, a shank at the outer end of the handle, an oscillating cutting blade, pivoted at one end to the shank, a relatively stationary cutting member provided at its outer end with an inwardly and laterally extending hook disposed in a direction toward the shank, a link connecting the inner end of the relatively stationary cutting member with the shank of the handle, an operating lever, pivoted to the inner end of the handle and a connecting rod between the last mentioned cutting member and said operating lever, the outer end of the oscillating blade being pivoted to the shank of the relatively stationary cutting member and the cutting members and associated parts being in folded position at the initial stage of the cutting operation, the cutting edge of the blade being located between the pivot points of the blade.

2. A pruning shears comprising an elongated member, a cutting blade pivoted to one end portion of said member, a cutting member comprising a shank arranged to one side of the supporting member, the outer end of the shank being provided with an inwardly and laterally extending hook disposed in a direction toward the shank, the cutting blade being pivotally engaged with the shank at a point in close proximity to the hook, the cutting edge of the blade being located between the pivot points of the blade, a link pivotally connecting the supporting member and the inner end portion of the shank, and means for imparting endwise movement to the shank.

3. A pruning shears comprising an elongated member, a cutting blade pivoted to one end portion of said member, a cutting member comprising a shank arranged to one side of the supporting member, the outer end of the shank being provided with an inwardly and laterally extending hook disposed in a direction toward the shank, the cutting blade being pivotally engaged with the shank at a point in close proximity to the hook, the cutting edge of the blade being located between the pivot points of the blade, a link pivotally connecting the supporting member and the inner end portion of the shank, and means for imparting endwise movement to the shank, the cutting blade and the link being substantially in parallelism.

In testimony whereof I affix my signature.

AMIEL BRATSCHIE.